(12) United States Patent
Timinger

(10) Patent No.: US 12,129,985 B2
(45) Date of Patent: Oct. 29, 2024

(54) OPTICAL COUPLER, DESIGN METHOD THEREFOR, AND VEHICLE LIGHT THEREWITH

(71) Applicant: LUMILEDS LLC, San Jose, CA (US)

(72) Inventor: Andreas Lorenz Timinger, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/948,885

(22) Filed: Sep. 20, 2022

(65) Prior Publication Data

US 2023/0093382 A1 Mar. 23, 2023

Related U.S. Application Data

(60) Provisional application No. 63/246,160, filed on Sep. 20, 2021.

(51) Int. Cl.
*F21S 43/241* (2018.01)
*F21S 43/14* (2018.01)
*F21V 8/00* (2006.01)

(52) U.S. Cl.
CPC ............ *F21S 43/241* (2018.01); *F21S 43/14* (2018.01); *G02B 6/003* (2013.01); *G02B 6/0065* (2013.01)

(58) Field of Classification Search
CPC ............... G02B 6/0026; G02B 6/0023; G02F 1/133603; G02F 1/133606
See application file for complete search history.

(56) References Cited

U.S. PATENT DOCUMENTS

| | | | |
|---|---|---|---|
| 5,359,684 A * | 10/1994 | Hosokawa | G02B 6/1245 385/39 |
| 6,099,156 A * | 8/2000 | Jenkins | B29D 11/00 362/540 |
| 7,367,704 B1 | 5/2008 | Chang | |
| 2001/0035927 A1 | 11/2001 | Sasagawa et al. | |
| 2009/0016057 A1 * | 1/2009 | Rinko | G02B 6/0028 362/268 |

(Continued)

FOREIGN PATENT DOCUMENTS

| | | | |
|---|---|---|---|
| EP | 1000296 B1 | 12/2002 | |
| JP | 2007-073469 A | 3/2007 | |
| WO | WO-2019231901 A1 * | 12/2019 | G02B 6/0028 |

OTHER PUBLICATIONS

International Search Report and Written Opinion mailed on Jan. 4, 2023 for PCT International Application No. PCT/US2022/044120.

*Primary Examiner* — Eric T Eide
(74) *Attorney, Agent, or Firm* — Volpe Koenig

(57) ABSTRACT

An optical coupler is described herein. The optical coupler includes at least one optical coupler unit. The at least one optical coupler includes an optical coupler entrance face and an optical coupler exit face. The optical coupler entrance face is configured to face, and receive light emitted by, at least one LED during operation. The optical coupler exit face is shaped as a Fresnel lens with a focal point at or behind a light emitting area of the at least one LED and is configured to face a lightguide entrance face of a slab lightguide. The optical coupler exit face has dimensions that match at least a part of the lightguide entrance face. The optical coupler entrance and exit faces are configured to refract light emitted by the at least one LED during operation.

16 Claims, 5 Drawing Sheets

(56) References Cited

U.S. PATENT DOCUMENTS

| | | | |
|---|---|---|---|
| 2010/0220260 A1* | 9/2010 | Sugita | G02F 1/133615 349/62 |
| 2010/0220261 A1* | 9/2010 | Mizushima | G02F 1/133615 362/606 |
| 2013/0335821 A1* | 12/2013 | Robinson | G06F 3/012 359/464 |
| 2014/0041205 A1* | 2/2014 | Robinson | G02B 6/0026 29/592.1 |

* cited by examiner

OPTICAL COUPLER, DESIGN METHOD THEREFOR, AND VEHICLE LIGHT THEREWITH

CROSS REFERENCE TO RELATED APPLICATIONS

This application claims the benefit of U.S. Provisional Patent Application No. 63/246,160, which was filed on Sep. 20, 2021, the contents of which are hereby incorporated by reference herein.

BACKGROUND

Light emitting diodes (LEDs), which may encompass any and all semiconductor light emitting devices, including, for example, diode lasers, more and more replace older technology light sources due to superior technical properties, such as energy efficiency and lifetime. Combining LEDs with lightguides may open up a vast variety of designing new lights with enhanced functional as well as styling options. An important application field for such lights may be, for example, signaling (e.g., turn, stop, and info messages) and rear fog lights for vehicles.

SUMMARY

An optical coupler is described herein. The optical coupler includes at least one optical coupler unit. The at least one optical coupler includes an optical coupler entrance face and an optical coupler exit face. The optical coupler entrance face is configured to face, and receive light emitted by, at least one LED during operation. The optical coupler exit face is shaped as a Fresnel lens with a focal point at or behind a light emitting area of the at least one LED and is configured to face a lightguide entrance face of a slab lightguide. The optical coupler exit face has dimensions that match at least a part of the lightguide entrance face. The optical coupler entrance and exit faces are configured to refract light emitted by the at least one LED during operation.

BRIEF DESCRIPTION OF THE DRAWINGS

A more detailed understanding can be had from the following description, given by way of example in conjunction with the accompanying drawings wherein.

DETAILED DESCRIPTION

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present disclosure. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures, unless explicitly stated otherwise. It will be understood that these terms are intended to encompass different orientations of the device in addition to the orientation depicted in the figures.

Figure 1:
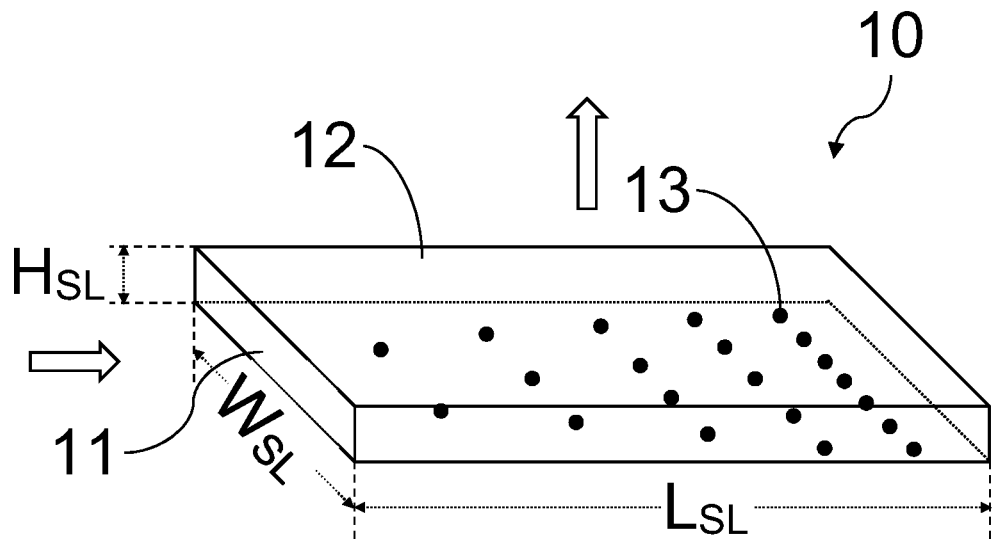
FIG. 1 is a schematic perspective view of an example slab lightguide.

The advent of lightguides in vehicle exterior lighting has opened up many new design alternatives for signaling and rear fog lights as well as for styling elements on the vehicles (e.g., for brand promotion but also for communication purposes to other traffic participants as, for example, discussed in connection with autonomous vehicles). FIG. 1 is a schematic perspective view of a slab lightguide 10, also referred to as a lightguide plate. In the example illustrated in FIG. 1, the light enters the slab lightguide 10 from the left via its lightguide entrance face 11 and is outcoupled from the slab lightguide 10 to the top via the lightguide emission face 12. Lightguide extraction features 13, here schematically indicated as small indentations on the lightguide's lower face opposite the lightguide emission face 12, may control the light outcoupling. They may be structured and distributed to promote, for example, a homogenous luminance over the longitudinal extension of the lightguide emission face 12 with an angular distribution of the emission concentrated transverse to the lightguide emission face 12.

Figure 2:
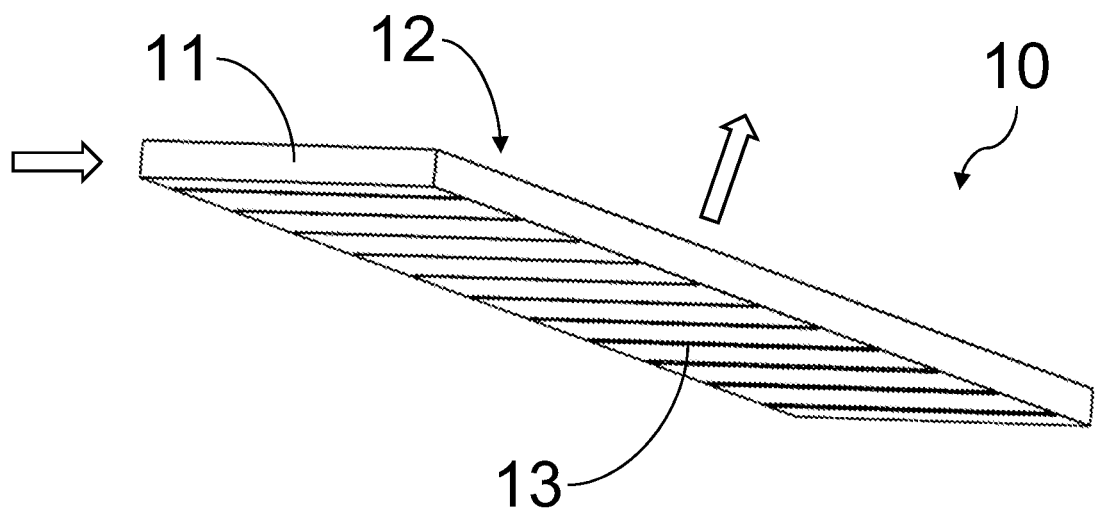
FIG. 2 is a schematic perspective view of another example slab lightguide.

While the slab lightguide 10 in FIG. 1 is illustrated as a straight cuboid with plane faces, such lightguides might also be curved (around a curved central longitudinal line) and might also have curved faces. To avoid light outcoupling at the side faces (along the longitudinal direction) other than the lightguide emission face 12, mirror coatings may support total internal reflection (TIR) at these faces. Additionally, a mirror coating may also be applied at the end face (opposite the lightguide entrance face 11) to avoid light loss there. The lightguide extraction features 13, only schematically indicated in FIG. 1, in practice, may be realized as macroscopic structures specifically changing the angles of the specular reflection at the lightguide's lower face, or may be realized as microscopic structures randomizing the reflection at the lower face by scattering, diffraction, or diffusing. FIG. 2 shows in schematic perspective view a slab lightguide 10 with the lightguide extraction features 13 being formed as grooves on the lightguide's lower face.

Bending a slab lightguide 10 opens up a vast variety of design options for luminaires in general and for vehicle lights in particular. Such a bended slab lightguide 10 may, for example, follow the outer contour of a vehicle, thus, for example, a rear turn signal or a brake light may form a rounded corner of the vehicle's body providing visibility from the back as well as from the sides of the vehicle. However, straight slab lightguides 10 with plane faces may be useful, for example, as display backlights.

The lightguide entrance face dimensions may be termed in this disclosure as lightguide height $H_{LG}$ and lightguide width $W_{LG}$. The lightguide longitudinal extension may be termed lightguide length $L_{LG}$. These dimensions may be understood to apply to curved embodiments of a slab lightguide 10 as well where they may, for example, be defined as the dimensions of a hull of the resulting straight body when the bending of the slab lightguide 10 is reversed (e.g., for the longitudinal extension: straighten the central line connecting the midpoints of the lightguide entrance face 11 with the midpoint of the opposite lightguide end face without changing the central line's length element (e.g., without compressing and stretching the central line).

Figure 3:
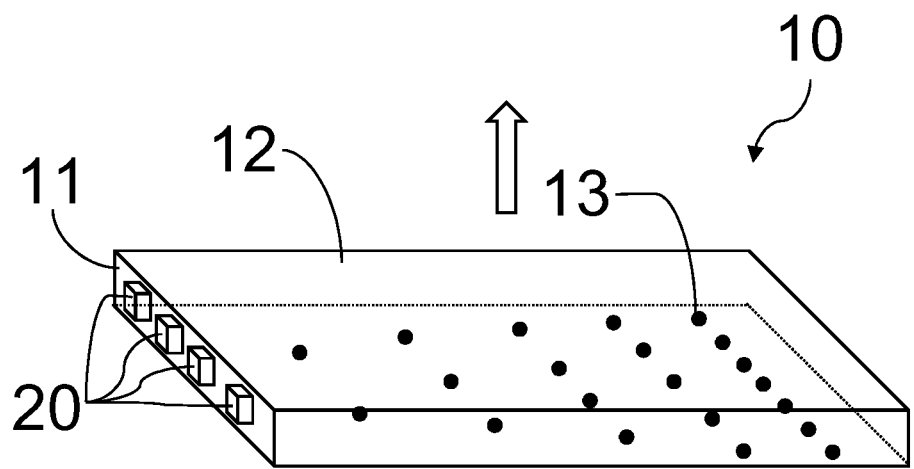
FIG. 3 is a schematic perspective view of LEDs directly coupling their light into a slab lightguide.
Figure 4:
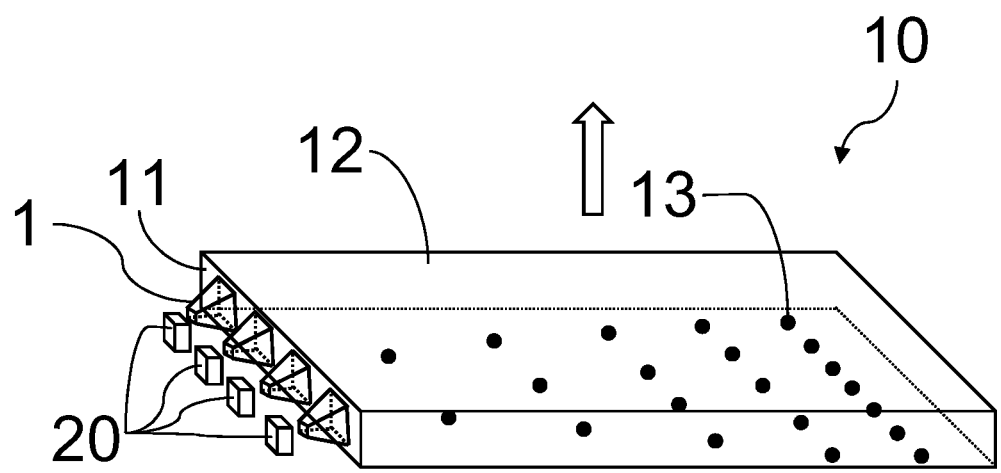
FIG. 4 is a schematic perspective view of LEDs coupling their light into a slab lightguide via conventional optical couplers.

Traditionally, for display backlights, for example, the light coupled into such slab lightguide 10 may be generated by a row of, for example, LEDs 20 either directly facing the lightguide entrance face 11 or using straight optical couplers 1 with more or less quadratic entrance and exit faces, with one optical coupler 1 for each LED 20. FIG. 3 is a schematic perspective view of LEDs directly coupling their light into a slab lightguide. FIG. 4 is a schematic perspective view of LEDs coupling their light into a slab lightguide via conventional optical couplers. In a display backlight, there may be enough space to realize such geometry, and using a multitude of LEDs may have advantages as backlights need ample amounts of light for high brightness.

In vehicle lights, however, such as in a rear combination light, there may be severe space limitations as vehicle designers consider reserving space for technical installations as a constraint. Additionally, depending on the lighting task, the light of only a few or even a single LED may be sufficient. Such situation may lead to a challenging situation for coupling the light into the slab lightguide.

Slab lightguides for vehicle lights, typically, are long and wide but thin devices. For example, typically, the slab lightguide's length $L_{SL}$ is greater than its width $W_{SL}$, which is much greater than its height $H_{SL}$. Thus, while the light of an LED 20 may not require much expansion in the height dimension to be coupled into the slab lightguide 10, in the width dimension, a considerable widening may be necessary, requiring strongly asymmetric optical couplers. Such asymmetric optical couplers, however, may lead to suboptimal results.

The slab lightguide 10 may only perform its function in an optimal way (e.g., deliver a homogenous, transverse concentrated beam from its lightguide emission face 12) when the beam profile at the lightguide entrance face 11 stays within close boundaries (e.g., is largely homogenous over the complete area of the lightguide entrance face 11 and, angularly, is concentrated around perpendicularly hitting the lightguide entrance face 11). Otherwise, light guiding losses, inhomogeneous luminosity, or undesired angular distributions at the lightguide emission face 12 may result. Modifying the quadratic entrance/exit face couplers of FIG. 4 only by widening their exit faces to long, thin rectangles, however, may lead to an attenuation of luminosity towards the edges of the optical coupler in the width direction. Additionally, the closer a light ray leaves the optical coupler at the edges in the width direction the more angled such ray may be with respect to the desired transverse direction to the coupler's exit face.

Such suboptimal results with traditional optical couplers may become even worse if space limitations, such as in a vehicle reverse light, make impossible a straight line connection between the LED's light emitting area and the slab lightguide's entrance face. Then, the optical coupler may need to be bended and such bends may cause further distortions in the homogeneity as well as in the transverse directionality of the light input at the lightguide's entrance face 11.

Figure 5:
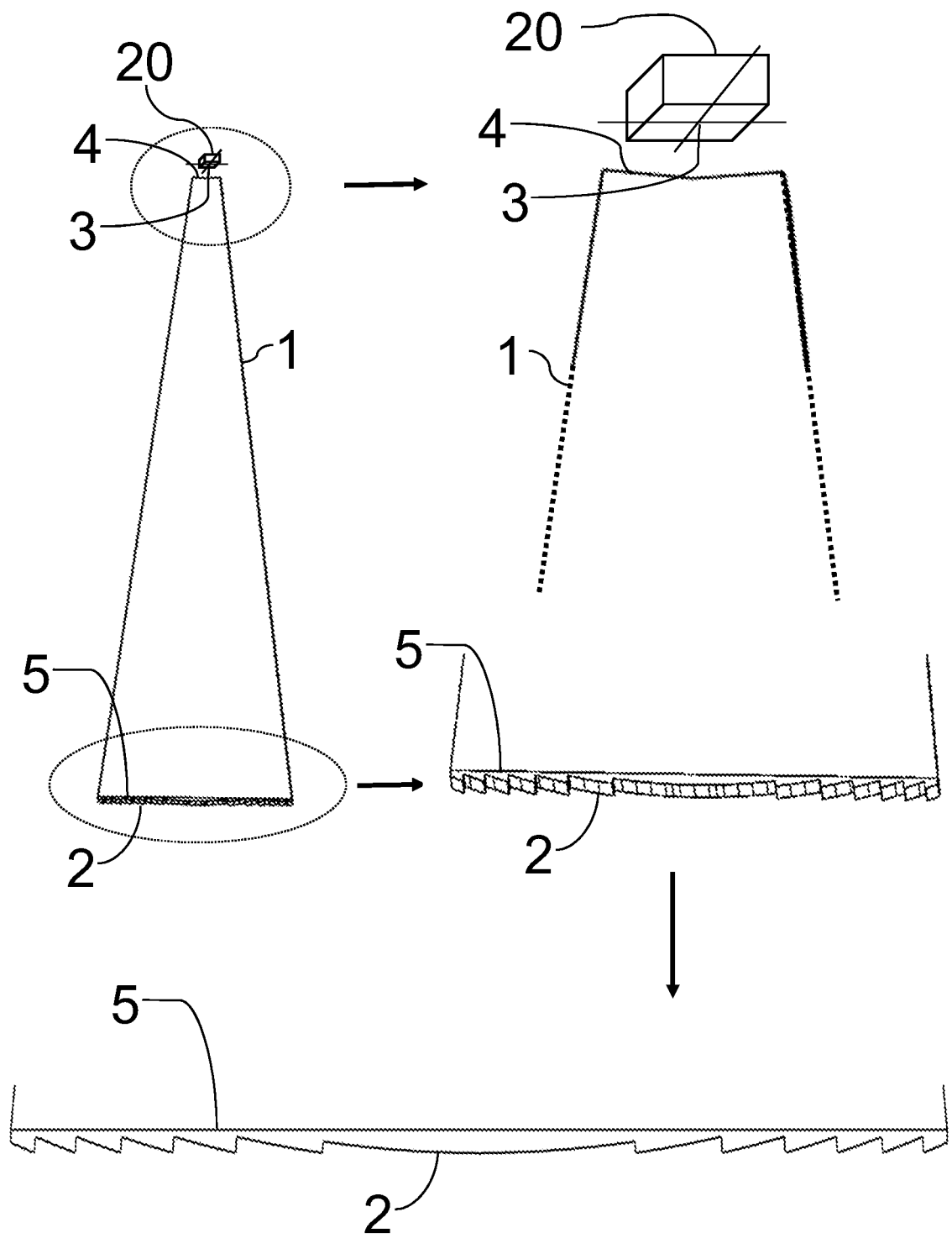
FIG. 5 is a schematic perspective view and a detail sectional view of an example optical coupler.

FIG. 5 is a schematic perspective view and a detail sectional view of an example optical coupler 1 in front of an LED 20, which may herein be a single LED or multiple LEDs placed near to each other, such as in a cluster or array-like manner, such as when using closely spaced LEDs up to μ-LED arrangements. On the upper left side, a full picture is given, and on the upper right side, the coupler entrance face 4 with LED 20 and the coupler exit face 5 are enlarged. In its lower part, FIG. 5 gives an even stronger enlarged sectional view of the Fresnel lens 2 of the coupler exit face 5. The focal point 3 of the Fresnel lens 2, indicated in FIG. 5 by a cross-hair, is at the mid-point of the light emitting area of LED 20.

Locating the focal point 3 of the Fresnel lens 2 at the light emitting area of the LED 20, thus having the light emitting area of LED 20 located in a focal plane of the Fresnel lens 2, may generate at the coupler exit face 5 a set of parallel light bundles with propagation directions centered around a normal to the coupler exit face 5. Locating the focal point 3 of the Fresnel lens 2 at least slightly behind the light emitting area of the LED 20 may generate, at the coupler exit face 5, a set of at least slightly diverging light bundles around propagation directions centered around a normal to the coupler exit face 5, thus, at the coupler exit face 5, with an angular distribution still concentrated around a direction transverse to the coupler exit face 5. This holds even under manufacturing tolerance such as when the focal point 3 of the Fresnel lens 2 and the light emitting area of the LED 20 are somewhat displaced or the focal plane of the Fresnel lens 2 and the light emitting area of LED 20 are at some small angle versus each other.

The coupler entrance face 4 may be a plane or may be concave towards the LED 20 as shown in FIG. 5. With an appropriately selected curvature of the coupler entrance face 4, the homogeneity and/or the angular distribution of the light of LED 20 transmitted through optical coupler 1 and leaving at the coupler exit face 5 may be further improved. For example, a concave curvature of the coupler entrance face 4 may provide a collimation of the light received from the LED 20. Thus, for example, the 180° Lambertian emission pattern of an unaided LED light emitting area may already be pre-collimated easing the task of the Fresnel lens 2 in generating a parallel or only slightly diverging beam pattern at the coupler exit face 5.

To obtain the desired homogeneity and angular distribution of the LED light at the coupler exit face 5, the coupler entrance and exit faces 4, 5 have to fulfil their optical function. In other words, refraction of the light emitted in operation by the LED 20 has to take place at the coupler entrance face 4 as well as at the coupler exit face 5. Such might be achieved by having ambient air as the medium surrounding the coupler entrance and exit faces 4, 5, for example, by having the coupler entrance face 4 at a distance to the light emitting area of the LED 20 and by having the coupler exit face 5 at another distance to the lightguide entrance face 11. However, refraction, in general, may already be achieved by avoiding optical contact between the coupler entrance and exit faces 4, 5 to the LED 20 and the lightguide entrance face 11 respectively. Thus, keeping them at a distance is one solution only while, for example, making them of materials with differing refraction indices is another allowing them to be adjacent to each other. Adjacency, however, may also be possible with the same materials as long as optical contact is avoided, for example, as long as the contact points/area are small (e.g., less than 10%, compared to the full areas of coupler entrance and exit faces 4, 5). Such point-wise contact only may be particularly interesting between the coupler exit face 5 and the lightguide entrance face 11 where the contact may take place only at the peaks or ridges of the Fresnel lens 2.

As said previously, slab lightguides for vehicle lights typically are long and wide but thin devices. For example, typically, the slab lightguide's length $L_{SL}$ is greater than its width $W_{SL}$, which again is much greater than its height $H_{SL}$. In particular, while the height $H_{SL}$ of a slab lightguide 10 may be comparable to a height of a light input easily collectable from an LED 20 (e.g., may be comparable or only some 10% larger than a height of a light emitting area of LED 20), the width $W_{SL}$ of a slab lightguide 10 may be much larger than a width of a light input easily collectable from an LED 20 (e.g., much larger than a width of a light emitting area of LED 20).

Figure 7:
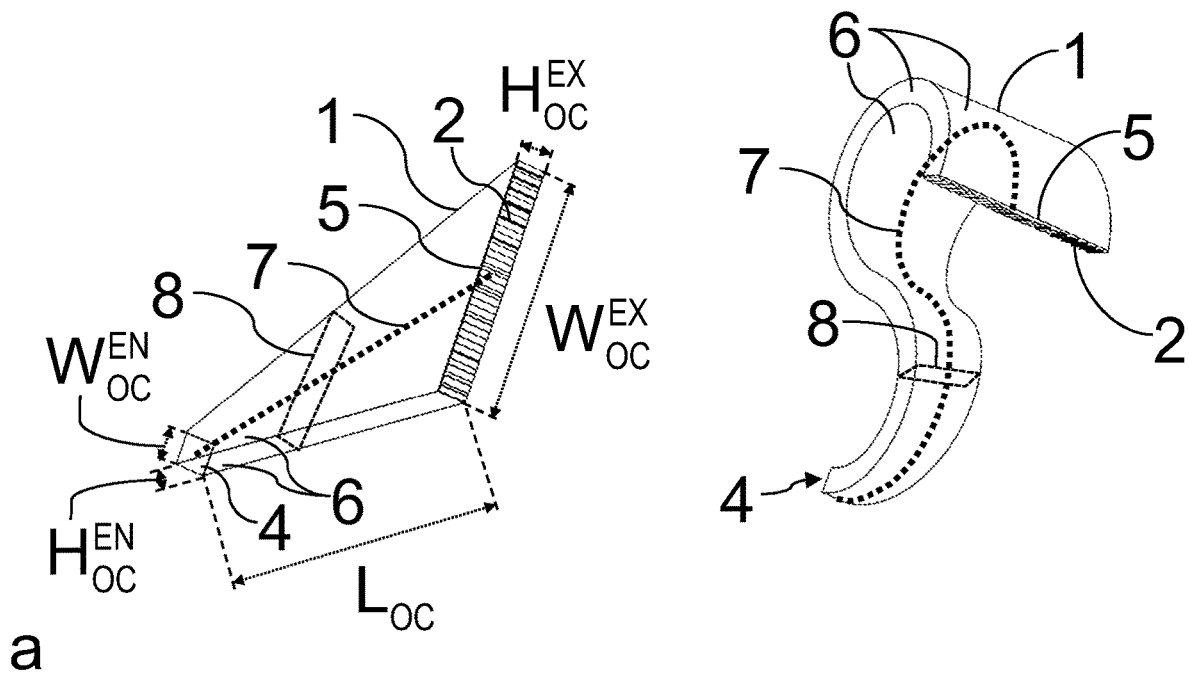
FIG. 7 is a schematic perspective view of a straight and a bended optical coupler.

For the coupler 1 described herein, for example, this means that, while a ratio of a height $H_{OC}^{EX}$ of the coupler exit face 5 to a height $H_{OC}^{EN}$ of the coupler entrance face 4 may reside between 1 and 2, a ratio of a width $W_{OC}^{EX}$ of the coupler exit face 5 to a width $W_{OC}^{EN}$ of the coupler entrance face 4 may be desired to be larger than 3 (cf. FIG. 7 for the nomenclature). Such might allow, for narrow enough slab lightguides 10, to select matching dimensions between the coupler exit face 5 and the whole of the lightguide entrance face 11. For example, the height $H_{OC}^{EX}$ and width $W_{OC}^{EX}$ of the coupler exit face 5 may be chosen approximately identical to height $H_{SL}$ and width $W_{SL}$ of the lightguide entrance face 11. For such narrow slab lightguides 10, a single disclosed optical coupler 1, with a single or multiple LEDs 20 at its coupler entrance face 4, and its coupler exit face 5 one-to-one covering the lightguide entrance face 11, may provide enough light to the slab lightguide 10. For wider slab lightguides 10, an arrangement of optical couplers 1 may be employed. For that, multiple optical couplers 1 may be used together with a multitude of one or more LEDs 20. The coupler entrance face 4 of each of the optical couplers 1 may be placed in front of one (or more) of the LEDs 2 of the multitude of LEDs to receive its light and guide it to its coupler exit face 5. The coupler exit faces 5 of the optical couplers 1 of the multitude of optical couplers 1 may be placed beside each other in the width dimension such that they together (e.g., the union of the coupler exit faces 5) one-to-one cover the lightguide entrance face 11.

In any case, using one or more of the optical couplers 1 described herein may allow for choosing the locations of the one or more LEDs 20 and of the lightguide entrance face 11 largely independent of each other. If so required, for that, the optical couplers 1 may also be bended, each one as needed by the relative position of its LED 20 to the respective part of the lightguide input face 11 associated with the optical coupler 1 and as enabled by the space offered by the housing of the vehicle light.

Figure 6:
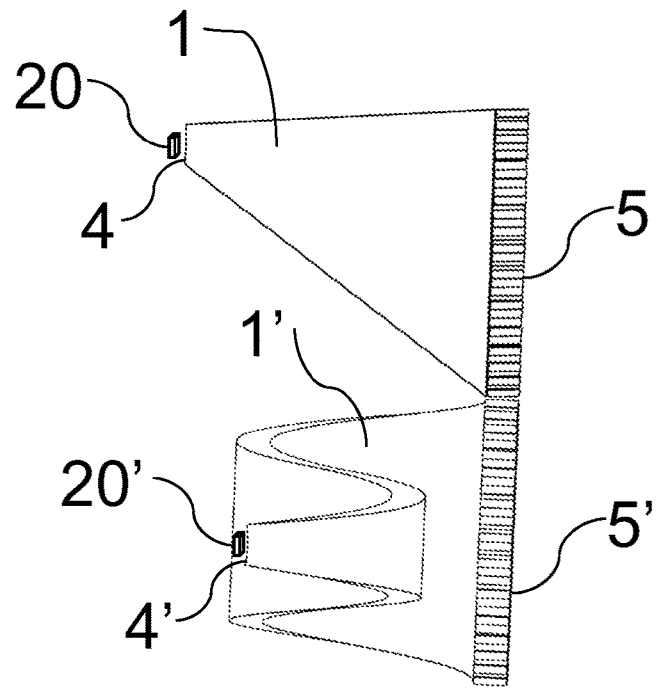
FIG. 6 is a schematic perspective view an example arrangement of optical couplers.

FIG. 6 is a schematic perspective view an example arrangement of optical couplers. In the example illustrated in FIG. 6, an arrangement of two optical couplers 1, 1' have their coupler exit faces 5, 5' placed beside each other in the width direction, for example, to cover the lightguide entrance face 11 (not shown as in front of the drawing plane)). Optical coupler 1 may be straight, and its coupler entrance face 4 may receive the light emitted by the LED 20. The optical coupler 1' may be curved (e.g., in an S-shape) and, via its coupler entrance face 4', may receive light emitted by LED 20'. LEDs 20, 20' may be placed anywhere in the housing of the vehicle light where enough space is offered.

Such arrangement of optical couplers 1, 1' may yield a large degree of design freedom for shaping light housings, in particular in the vehicle domain where, for example, it may be desirable for flat extended housings to follow the contour of the vehicle body. Thus, a vehicle light, such as a vehicle rear combination light, may be made according to the embodiments described herein by incorporating one or more of the optical couplers described herein or arrangements thereof together with the LEDs and the slab lightguide or lightguides they couple to each other, and a housing for accommodating these components.

FIG. 7 is a schematic perspective view of a straight and a bended optical coupler. A straight optical coupler 1 is illustrated on the left side of the drawing, and a curved or S-shaped optical coupler 1 is illustrated on the right side of the drawing. For each optical coupler 1, coupler side faces 6 may connect the coupler entrance face 4 with the coupler exit face 5 (e.g., shaped as a Fresnel lens 2). The coupler side faces 6, according to the details of the beam shaping when coupling the LED light from the coupler entrance face 4 to the coupler exit face 5, may be planar (on the left side) as well as curved (on the right side). Also, the edges of the coupler side faces 6 may be straight (left side) as well as curved (right side).

For the straight optical coupler 1 on the left side of FIG. 7, its dimensions are indicated with $H_{OC}^{EN}$, $W_{OC}^{EN}$ denoting height and width of the coupler entry face 4, $L_{OC}$ denoting the length (longitudinal dimension) of the optical coupler 1, and $H_{OC}^{EX}$, $W_{OC}^{EX}$ denoting height and width of the coupler exit face 5.

Further discernible in FIG. 7 is a coupler central line 7 joining the mid-points (central points) of the coupler entrance and exit faces 4, 5 along the longitudinal extension $L_{OC}$ of the optical coupler 1. Transverse to the coupler central line 7, a cross-section 8 of optical coupler 1 is indicated. One might conceive of the three-dimensional shape of the optical coupler 1 being generated by sweeping a cross-section 8 starting from the coupler entrance face 4 transverse along the coupler central line 7 until the coupler exit face 5 is reached. To support a homogenous beam propagation inside the optical coupler 1 from coupler entrance face 4 to coupler exit face 5, the coupler cross-sections 8 may monotonously transfer the coupler entrance face 4 into the coupler exit face 5. In other words, in the setup of FIG. 7, the cross-sections 8 will widen from the coupler entrance face 4 to the coupler exit face 5.

Using such nomenclature, a coupler entrance face 4 may be designed so as to face an LED 20 (or a multitude of LEDs 20 if more light is required or desired). A coupler exit face 5 may be more specifically designed to face the lightguide entrance face 11. Dimensions $H_{OC}^{EX}$, $W_{OC}^{EX}$ of the coupler exit face 5 may be chosen to match dimensions of a part of a whole of the lightguide entrance face 11. In the case of a relatively narrow slab lightguide 10, the whole lightguide entrance face 11 may be covered by the coupler exit face 5 of a single optical coupler 1. Otherwise, the optical coupler exit face 5 may be designed such that the lightguide entrance face 11 may be covered by an arrangement of optical couplers 1 with such designed coupler exit faces 5 to be placed side by side in the width direction of the slab lightguide 10. The coupler exit face 5 may be further designed as a Fresnel lens 2 with a focal point 3 at or behind a light emitting area or areas of the single or multiple LEDs 20 to be coupled to the slab lightguide 10. The design may ensure that the light emitted in operation by the one or more LEDs 20 is refracted at the coupler entrance and exit faces 4, 5.

Figure 8:
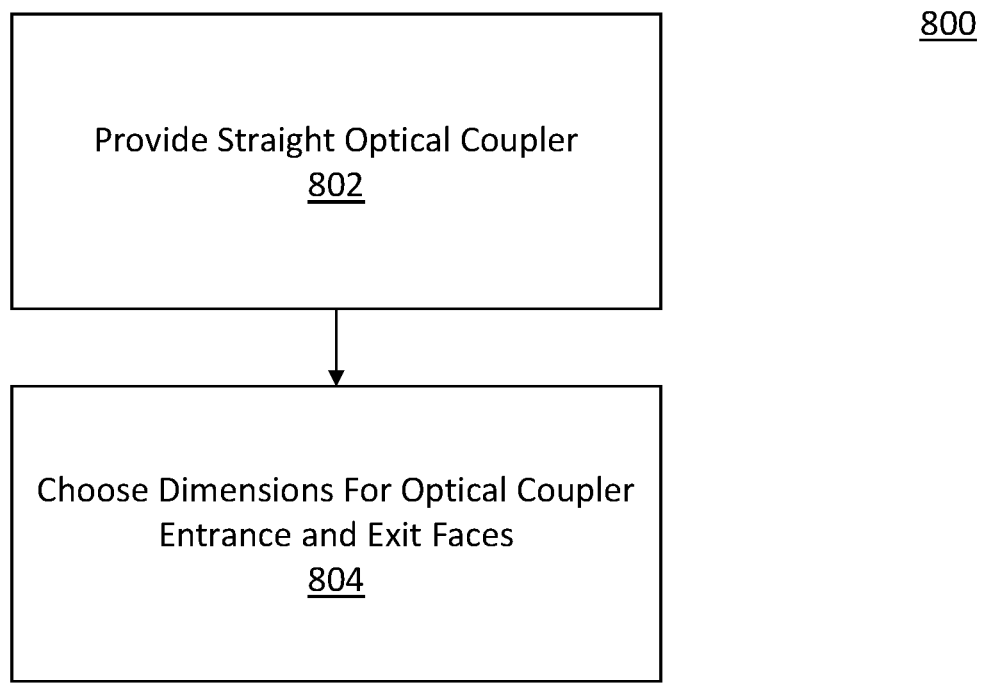
FIG. 8 is a flow diagram of an example method of manufacturing an optical coupler for coupling at least one LED to a slab lightguide.

FIG. 8 is a flow diagram of an example method 800 of manufacturing an optical coupler for coupling at least one LED to a slab lightguide. In the example illustrated in FIG. 8, the method includes providing a straight optical coupler (802). The method may further include choosing dimensions for the optical coupler exist and entrance faces (804). The dimensions may be chosen, for example, based on dimensions of at least a portion of a lightguide entrance face of the slab lightguide. Such method may further include joining mid-points (or central points) of the optical coupler entrance and exit faces 4, 5 by an optical coupler central line 7 along the optical couplers longitudinal dimension $L_{OC}$ and with the optical coupler central line 7 being transverse to the optical coupler entrance and exit faces 4, 5. The three-dimensional shape of the optical coupler 1 may be designed by moving an optical coupler cross section 8 transverse to the optical coupler central line 7 along the optical coupler central line 7 from the optical coupler entrance face 4 to the optical coupler exit face 5. On such movement, the design may take care to monotonously transform the optical coupler entrance face 4 into the coupler exit face 5.

Such method can be particularly easily applied to a straight optical coupler 1 as, for example, shown on the left side of FIG. 7. There, the optical coupler central line 7 is a straight line. However, also in a straight optical coupler 1, the coupler side faces 6 may not need to be just plane faces (as shown in the left part of FIG. 7). In general, not just in a straight optical coupler 1, but also in curved optical couplers 1, the optical coupler side faces 6 may not need be planar, but can also be faceted (e.g., a succession of plane part faces joining each other at an angle) or curved in a general way as long as the monotonous transformation of the coupler entrance face 4 into the coupler exit face 5 is respected (e.g., as long, in the situation of FIG. 7, the cross sections 8 widen from the coupler entrance face 4 to the coupler exit face 5). Examples of such monotonously curved profiles of convex, concave, or mixed convex and concave shapes for the coupler sides faces 6 may include opening parabolas, flutes, or similar shapes.

A curved optical coupler 1 (such as shown in the right part of FIG. 7) may be designed by starting from a straight optical coupler 1 (like in the left part of FIG. 7) and then arriving at the curved optical coupler 1 by bending. For that, the, first straight designed, coupler central line 7 may be bent into a curved line without changing its length element (e.g., without compressing or stretching it). The shape of the curved optical coupler 1 may then be obtained by, while bending the coupler central line 7, keeping the coupler cross sections 8 transverse to the coupler central line 7. As an example, one may obtain the curved optical coupler 1 on the right side of FIG. 7 from the straight optical coupler 1 on the left side of FIG. 7 by bending the straight optical coupler central line 7 on the left side of FIG. 7 into the S-shaped optical coupler central line 7 on the right side of FIG. 7. In that, the S-shape of the optical coupler central line 7 is just an example and one may select any other shape according to the needs of the application. For example. in a vehicle turn signal light extending around a vehicle corner to enhance visibility of the turn signal from the back and the sides, only few options may exist for positioning the LED(s) 20 and the slab lightguide 10.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An optical coupler comprising:
   at least one optical coupler unit comprising:
   a single optical coupler entrance face configured to face, and receive light emitted by, at least one LED during operation; and
   a single optical coupler exit face shaped as a Fresnel lens with a focal point at or behind a light emitting area of the at least one LED such that the light emitted by the at least one LED during operation is emitted out of the optical coupler exit face at right angles relative to the optical coupler exit face and configured to face a lightguide entrance face of a slab lightguide, wherein a ratio of a width of the single optical coupler exit face to a width of the single optical coupler entrance is greater than 3,
   the single optical coupler entrance and exit faces being configured to refract light emitted by the at least one LED during operation.

2. The optical coupler according to claim 1, wherein a ratio of a height of the single optical coupler exit face to a height of the single optical coupler exit face is between 1 and 2.

3. The optical coupler according to claim 1, wherein the single optical coupler entrance face is planar.

4. The optical coupler according to claim 1, wherein the single optical coupler entrance face is concave towards the at least one LED.

5. The optical coupler according to claim 1, wherein the single optical coupler entrance face is at a first distance from a light emitting surface of the at least one LED.

6. The optical coupler according to claim 5, wherein the single optical coupler exit face is at a second distance from the lightguide entrance face.

7. The optical coupler according to claim 1, wherein a contact area of the single optical coupler exit face to the lightguide entrance face is less than 10% of a full area of the single optical coupler exit face.

8. The optical coupler according to claim 1, further comprising:
an optical coupler central line joining central points of the single optical coupler entrance and exit faces along a longitudinal dimension of the optical coupler transverse to the single optical coupler entrance and exit faces; and
optical coupler cross sections transverse to the optical coupler central line, wherein, when moving along the optical coupler central line from the single optical coupler entrance face to the single optical coupler exit face, the optical coupler cross sections monotonously transform the single optical coupler entrance face into the single optical coupler exit face.

9. The optical coupler according to claim 1, further comprising optical coupler side faces that each have an undulating shape and join the single optical coupler entrance and exit faces along a longitudinal dimension of the optical coupler.

10. The optical coupler according to claim 1, wherein:
the at least one optical coupler unit comprises a plurality of optical coupler units,
the at least one LED comprises a plurality of LEDs,
each optical coupler unit coupled one LED of the plurality of LEDs to a portion of the lightguide entrance face,
the single optical coupler exit face of each of the plurality of optical coupler units being arranged beside each other in their width dimension, and
dimensions of a union of the single optical coupler exit face of each of the plurality of optical coupler units match dimensions of the lightguide entrance face.

11. A vehicle light comprising:
at least one LED;
a slab light guide;
at least one optical coupler between the at least one LED and the slab light guide, the at least one optical coupler unit comprising:
at least one optical coupler unit comprising:
a single optical coupler entrance face configured to face, and receive light emitted by, at least one LED during operation, and
a single optical coupler exit face shaped as a Fresnel lens with a focal point at or behind a light emitting area of the at least one LED such that the light emitted by the at least one LED during operation is emitted out of the optical coupler exit face at right angles relative to the optical coupler exit face and configured to face a lightguide entrance face of a slab lightguide, wherein a ratio of a width of the single optical coupler exit face to a width of the single optical coupler entrance is greater than 3,
the single optical coupler entrance and exit faces being configured to refract light emitted by the at least one LED during operation; and
a housing configured to accommodate the at least one LED, the slab light guide and the at least one optical coupler.

12. The vehicle light of claim 11, wherein the single optical coupler entrance face is one of planar or concave towards the at least one LED.

13. The vehicle light of claim 11, wherein:
the at least one optical coupler unit comprises a plurality of optical coupler units,
the at least one LED comprises a plurality of LEDs,
wherein each optical coupler unit couples one LED of the plurality of LEDs to a portion of the single lightguide entrance face,
the single optical coupler exit face of each of the plurality of optical coupler units being arranged beside each other in their width dimension, and
dimensions of a union of the single optical coupler exit face of each of the plurality of optical coupler units match dimensions of the lightguide entrance face.

14. A method of manufacturing an optical coupler for coupling at least one LED to a slab lightguide, the method comprising:
providing a straight optical coupler;
choosing dimensions for a single optical coupler entrance face and a single optical coupler exit face based on dimensions of at least a portion of a lightguide entrance face of the slab lightguide such that at least a ratio of a width of the single optical coupler exit face to a width of the single optical coupler entrance face is greater than 3, the single optical coupler entrance face being configured to face the at least one LED and the single optical coupler exit face being configured to face the lightguide entrance face, and the single optical coupler entrance and exit faces being configured to refract light emitted by the at least one LED during operation; and
selecting a shape for optical coupler side faces joining the single optical coupler entrance and exit faces along a longitudinal dimension of the optical coupler as an undulating shape.

15. The method according to claim 14, wherein the optical coupler further comprises:
an optical coupler central line joining central points of the single optical coupler entrance and exit faces along a longitudinal dimension of the optical coupler transverse to the single optical coupler entrance and exit faces, and
optical coupler cross sections transverse to the coupler central line, wherein the method further comprises:
when moving along the optical coupler central line from the single optical coupler entrance face to the single optical coupler exit face, the optical coupler cross sections monotonously transforming the single optical coupler entrance face into the single optical coupler exit face.

16. The method according to claim 14, further comprising bending the optical coupler by:
bending the optical coupler central line into a curved line without compressing and stretching the optical coupler, and,
on such bending, keeping the optical coupler cross sections transverse to the optical coupler central line.

* * * * *